US009959783B2

(12) United States Patent
Hughes

(10) Patent No.: US 9,959,783 B2
(45) Date of Patent: *May 1, 2018

(54) CONVERTING AUDIO TO HAPTIC FEEDBACK IN AN ELECTRONIC DEVICE

(71) Applicant: Apple Inc., Cupertino, CA (US)

(72) Inventor: Gregory F. Hughes, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/469,368

(22) Filed: Mar. 24, 2017

(65) Prior Publication Data

US 2017/0316718 A1    Nov. 2, 2017

Related U.S. Application Data

(63) Continuation of application No. 14/752,334, filed on Jun. 26, 2015, now Pat. No. 9,607,527, which is a continuation of application No. 13/231,381, filed on Sep. 13, 2011, now Pat. No. 9,083,821.

(60) Provisional application No. 61/493,380, filed on Jun. 3, 2011.

(51) Int. Cl.
*G09B 21/00* (2006.01)
*H04M 19/04* (2006.01)
*G08B 1/08* (2006.01)

(52) U.S. Cl.
CPC ........ *G09B 21/009* (2013.01); *H04M 19/047* (2013.01); *G08B 1/08* (2013.01)

(58) Field of Classification Search
CPC ...... G09B 21/009; H04M 19/047; G08B 1/08
See application file for complete search history.

(56) References Cited

U.S. PATENT DOCUMENTS

| 6,577,739 | B1 | 6/2003 | Hurtig et al. |
| 6,714,825 | B1 | 3/2004 | Tanaka |
| 6,731,769 | B1 * | 5/2004 | Lenhardt ............. H04R 25/502 381/316 |
| 7,801,569 | B1 | 9/2010 | Zellner |

(Continued)

FOREIGN PATENT DOCUMENTS

| JP | 11-038865 | 12/1999 |
| JP | 2004-240855 | 6/2004 |
| WO | WO 2011/049609 A2 | 4/2011 |

OTHER PUBLICATIONS

Chang et al., "Audio-Haptic Feedback in Mobile Phones", CHI 2005, Portland, Oregon, Apr. 2-7, 2005, 4 pages.

(Continued)

*Primary Examiner* — Sisay Yacob
(74) *Attorney, Agent, or Firm* — Morgan, Lewis & Bockius LLP

(57) ABSTRACT

In general, in one aspect, a method performed by one or more processes executing on a computer systems includes receiving an audio signal comprising a range of audio frequencies including high frequencies and low frequencies, converting a first portion of the range of audio frequencies into haptic data, shifting a second portion of the range of audio frequencies down to lower audio frequencies, and presenting at least one of the converted first portion and the shifted second portion to a human user. Other implementations of this aspect include corresponding systems, apparatus, and computer program products.

57 Claims, 8 Drawing Sheets

(56) References Cited

U.S. PATENT DOCUMENTS

| | | |
|---|---|---|
| 9,083,821 B2 | 7/2015 | Hughes |
| 2007/0133770 A1 | 6/2007 | LaPierre et al. |
| 2007/0154030 A1* | 7/2007 | Moses .................. H04R 25/606 381/72 |
| 2007/0176742 A1 | 8/2007 | Hofmann et al. |
| 2007/0193436 A1* | 8/2007 | Chu ........................ G06F 3/016 84/609 |
| 2007/0237342 A1 | 10/2007 | Agranat |
| 2009/0231276 A1* | 9/2009 | Ullrich ................... G06F 3/016 345/157 |
| 2010/0004033 A1 | 1/2010 | Choe et al. |
| 2010/0066512 A1* | 3/2010 | Rank ...................... G06F 3/016 340/407.2 |
| 2010/0260371 A1* | 10/2010 | Afshar .................... H04R 7/24 381/394 |
| 2010/0261509 A1 | 10/2010 | Kovvali et al. |
| 2010/0315211 A1* | 12/2010 | Le-Faucheur ......... G06F 1/1613 340/407.1 |
| 2011/0102160 A1 | 5/2011 | Heubel et al. |
| 2012/0306631 A1 | 12/2012 | Hughes |
| 2016/0042666 A1 | 11/2016 | Hughes |

OTHER PUBLICATIONS

Office Action, dated Feb. 24, 2014, received in U.S. Appl. No. 13/231,381, 26 pages.
Final Office Action, dated Oct. 9, 2014, received in U.S. Appl. No. 13/231,381, 24 pages.
Notice of Allowance, dated Mar. 16, 2015, received in U.S. Appl. No. 13/231,381, 9 pages.
Office Action, dated Jan. 20, 2016, received in U.S. Appl. No. 14/752,334, 19 pages.
Final Office Action, dated Jul. 27, 2016, received in U.S. Appl. No. 14/752,334, 30 pages.
Notice of Allowance, dated Nov. 15, 2016, received in U.S. Appl. No. 14/752,334, 7 pages.

* cited by examiner

CONVERTING AUDIO TO HAPTIC FEEDBACK IN AN ELECTRONIC DEVICE

RELATED APPLICATIONS

This application is a continuation application of U.S. application Ser. No. 14/752,334, filed Jun. 26, 2015, which is a continuation of U.S. application Ser. No. 13/231,381, filed Sep. 13, 2011, now U.S. Pat. No. 9,083,821, which claims priority to U.S. Provisional Application Ser. No. 61/493,380, filed Jun. 3, 2011, all of which are incorporated by reference herein in their entireties.

TECHNICAL FIELD

This disclosure relates generally to shifting audio frequency ranges and converting audio data into haptic data to convey information through haptic feedback to a user of a mobile device.

BACKGROUND

A person with a hearing impairment may be deaf to certain frequencies potentially limiting the person's ability to fully realize information contained in audio data. For example, listening to music rich in high frequencies may be less enjoyable to a person who is partially or completely deaf to some or all of those high frequencies.

Mobile devices typically include a mechanism for providing haptic feedback. For example, a mobile phone may include a motor, e.g., a piezoelectric motor, for providing haptic feedback to a user of the mobile device.

SUMMARY

This disclosure describes technology, which can be implemented as a method, apparatus, and/or computer software embodied in a computer-readable medium, to convert audio data to haptic data, for example, for use in conveying audible information to a hearing-impaired user of a mobile device through haptic feedback.

In general, in one aspect, a method performed by one or more processes executing on a computer systems includes receiving an audio signal comprising a range of audio frequencies including high frequencies and low frequencies, converting a first portion of the range of audio frequencies into haptic data, shifting a second portion of the range of audio frequencies down to lower audio frequencies, and presenting at least one of the converted first portion and the shifted second portion to a human user. Other implementations of this aspect include corresponding systems, apparatus, and computer program products.

This, and other aspects, can include one or more of the following features. The performance of the converting and the shifting can overlap in time at least in part. The performance of the converting and the shifting can be order independent. The presenting may occur while one or more of the receiving, converting and shifting are ongoing. Presenting the converted first portion may comprise providing the human user with haptic feedback via a haptic mechanism associated with the electronic device and the haptic feedback may comprise vibration. Presenting the shifted second portion may comprise providing the human user with sounds corresponding to the shifted second portion via an audio output mechanism associated with the electronic device. The first portion and the second portion may be mutually exclusive. The first portion and the second portion may overlap at least in part. Converting the first portion may comprise converting a subset of the low frequencies to haptic data. Shifting the second portion may comprise shifting a subset of the high frequencies to lower frequencies. The electronic device may comprise a mobile communications device having an audio subsystem and a haptic subsystem. The one or both of the converting and the shifting may be performed according to one or more hearing-related parameters associated with the human user where the hearing-related parameters associated with the human user may be defined by a hearing profile associated with the human user.

Potential advantages described in this disclosure may include improved delivery of audible data to a hearing-impaired user of a mobile device. For example, a user of a mobile device may have a specific hearing impairment that renders the user partially or completely deaf to a certain range of high frequencies. By shifting that particular range of high frequencies into a frequency range audible to the hearing-impaired user, and converting to a vibration pattern those frequencies in a lower frequency range that convey sound effect information, the hearing-impaired user may still be provided with the sensation of enjoying the original information in the audio data.

Another potential advantage may include real-time audio frequency shifting and conversion into haptic data. For example, a user of a mobile device may be at a concert listening to music rich in high frequencies. The user may desire to have the high frequencies shifted to different frequencies and/or converted into a vibration pattern to augment the audible information. Such conversion can be done in a real-time manner at the mobile device and the information can be conveyed to the user through any suitable audio reproduction device and/or haptic mechanism.

Another potential advantage may include using a haptic mechanism of a mobile device to alert a user of specific events. For example, a unique vibration pattern may be assigned to any number of events such that the unique vibration pattern can alert the user of the specific event. For example, ambient noise can be detected by the mobile device, e.g., fire alarms, cars, emergency vehicles, car horns, screams, dog barking, music, environmental noise, phone ringing, knock at the door, etc. In response to detecting the ambient noise, a unique vibration pattern can be actuated by a haptic mechanism within a mobile device to augment the auditory information with haptic feedback. In some implementations, a database of classified sounds may exist. Ambient audio data received by a mobile device may be compared with the database to determine a classification of the ambient audio data and upon determining the type of audio data the ambient audio data corresponds to, haptic feedback may be provided to a user of the mobile device based on the classification.

Another potential advantage may include using haptic feedback in connection with a musical instrument. For example, a hearing impaired user may play a musical instrument and concurrently receive haptic feedback from a mobile device that informs them user whether they are playing the musical instrument in the correct tune or playing a song correctly.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
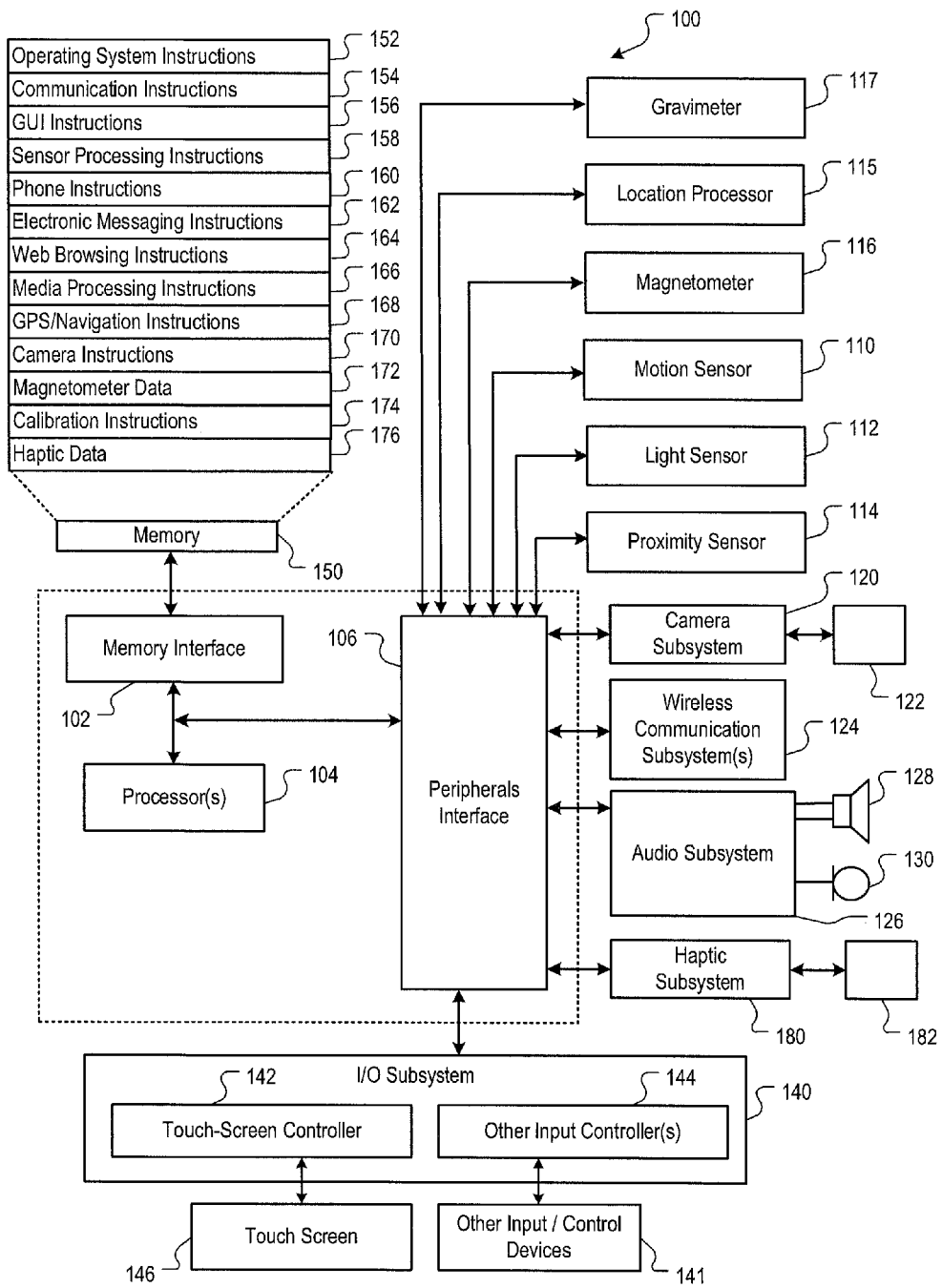
FIG. 1 is a block diagram of exemplary architecture of a mobile device.

FIG. 1 is a block diagram of exemplary architecture 100 of a mobile device configured to perform motion-based operations. A mobile device can include memory interface 102, one or more data processors, image processors and/or processors 104, and peripherals interface 106. Memory interface 102, one or more processors 104 and/or peripherals interface 106 can be separate components or can be integrated in one or more integrated circuits. Processors 104 can include one or more application processors (APs) and one or more baseband processors (BPs). The application processors and baseband processors can be integrated in one single process chip. The various components in mobile device 100, for example, can be coupled by one or more communication buses or signal lines.

Sensors, devices, and subsystems can be coupled to peripherals interface 106 to facilitate multiple functionalities. For example, motion sensor 110, light sensor 112, and proximity sensor 114 can be coupled to peripherals interface 106 to facilitate orientation, lighting, and proximity functions of the mobile device. Motion sensor 110 can include one or more accelerometers configured to determine change of speed and direction of movement of the mobile device. Location processor 115 (e.g., GPS receiver) can be connected to peripherals interface 106 to provide geopositioning. Electronic magnetometer 116 (e.g., an integrated circuit chip) can also be connected to peripherals interface 106 to provide data that can be used to determine the direction of magnetic North. Thus, electronic magnetometer 116 can be used as an electronic compass. Gravimeter 117 can be coupled to peripherals interface 106 to facilitate measurement of a local gravitational field of Earth.

Camera subsystem 120 and an optical sensor 122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 124, which can include radio frequency receivers and transmitters and/or optical (e.g., infrared) receivers and transmitters. The specific design and implementation of the communication subsystem 124 can depend on the communication network(s) over which a mobile device is intended to operate. For example, a mobile device can include communication subsystems 124 designed to operate over a CDMA system, a WiFi™ or WiMax™ network, and a Bluetooth™ network. In particular, the wireless communication subsystems 124 can include hosting protocols such that the mobile device can be configured as a base station for other wireless devices.

Audio subsystem 126 can be coupled to a speaker 128 and a microphone 130 to facilitate voice-enabled functions, such as voice recognition, voice replication, digital recording, and telephony functions. In addition, microphone 130 may detect ambient noise and other audible frequencies.

Haptic subsystem 180 and haptic mechanism 182, e.g., spinning motor, servo motor, piezoelectric motor, vibrator, etc., can be utilized to facilitate haptic feedback, such as vibration, force, and/or motions.

I/O subsystem 140 can include touch screen controller 142 and/or other input controller(s) 144. Touch-screen controller 142 can be coupled to a touch screen 146 or pad. Touch screen 146 and touch screen controller 142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 146.

Other input controller(s) 144 can be coupled to other input/control devices 148, such as one or more buttons, rocker switches, thumb-wheel, infrared port, USB port, and/or a pointer device such as a stylus. The one or more buttons (not shown) can include an up/down button for volume control of speaker 128 and/or microphone 130.

In one implementation, a pressing of the button for a first duration may disengage a lock of the touch screen 146; and a pressing of the button for a second duration that is longer than the first duration may turn power to mobile device 100 on or off. The user may be able to customize a functionality of one or more of the buttons. The touch screen 146 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player. Mobile device 100 may, therefore, include a pin connector that is compatible with the iPod. Other input/output and control devices can also be used.

Memory interface 102 can be coupled to memory 150. Memory 150 can include high-speed random access memory and/or non-volatile memory, such as one or more magnetic disk storage devices, one or more optical storage devices, and/or flash memory (e.g., NAND, NOR). Memory 150 can store operating system 152, such as Darwin, RTXC, LINUX, UNIX, OS X, WINDOWS, or an embedded operating system such as VxWorks. Operating system 152 may include instructions for handling basic system services and for performing hardware dependent tasks. In some implementations, operating system 152 can include a kernel (e.g., UNIX kernel).

Memory 150 may also store communication instructions 154 to facilitate communicating with one or more additional devices, one or more computers and/or one or more servers. Memory 150 may include graphical user interface instructions 156 to facilitate graphic user interface processing; sensor processing instructions 158 to facilitate sensor-related processing and functions; phone instructions 160 to facilitate phone-related processes and functions; electronic messaging instructions 162 to facilitate electronic-messaging related processes and functions; web browsing instructions 164 to facilitate web browsing-related processes and functions; media processing instructions 166 to facilitate media processing-related processes and functions; GPS/Navigation instructions 168 to facilitate GPS and navigation-related processes and instructions; camera instructions 170 to facilitate camera-related processes and functions; magnetometer data 172 and calibration instructions 174 to facilitate magnetometer calibration. The memory 150 may also store other software instructions (not shown), such as security instructions, web video instructions to facilitate web video-related processes and functions, and/or web shopping instructions to facilitate web shopping-related processes and functions. In some implementations, the media processing instructions 166 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 150. Memory 150 can include haptic instructions 176. Haptic data 176 can be configured to cause the mobile device to perform haptic-based operations, for example providing haptic feedback to a user of the mobile device as described in reference to FIGS. 2-8.

Each of the above identified instructions and applications can correspond to a set of instructions for performing one or more functions described above. These instructions need not be implemented as separate software programs, procedures, or modules. Memory 150 can include additional instructions or fewer instructions. Furthermore, various functions of the mobile device may be implemented in hardware and/or in software, including in one or more signal processing and/or application specific integrated circuits.

Figure 2:
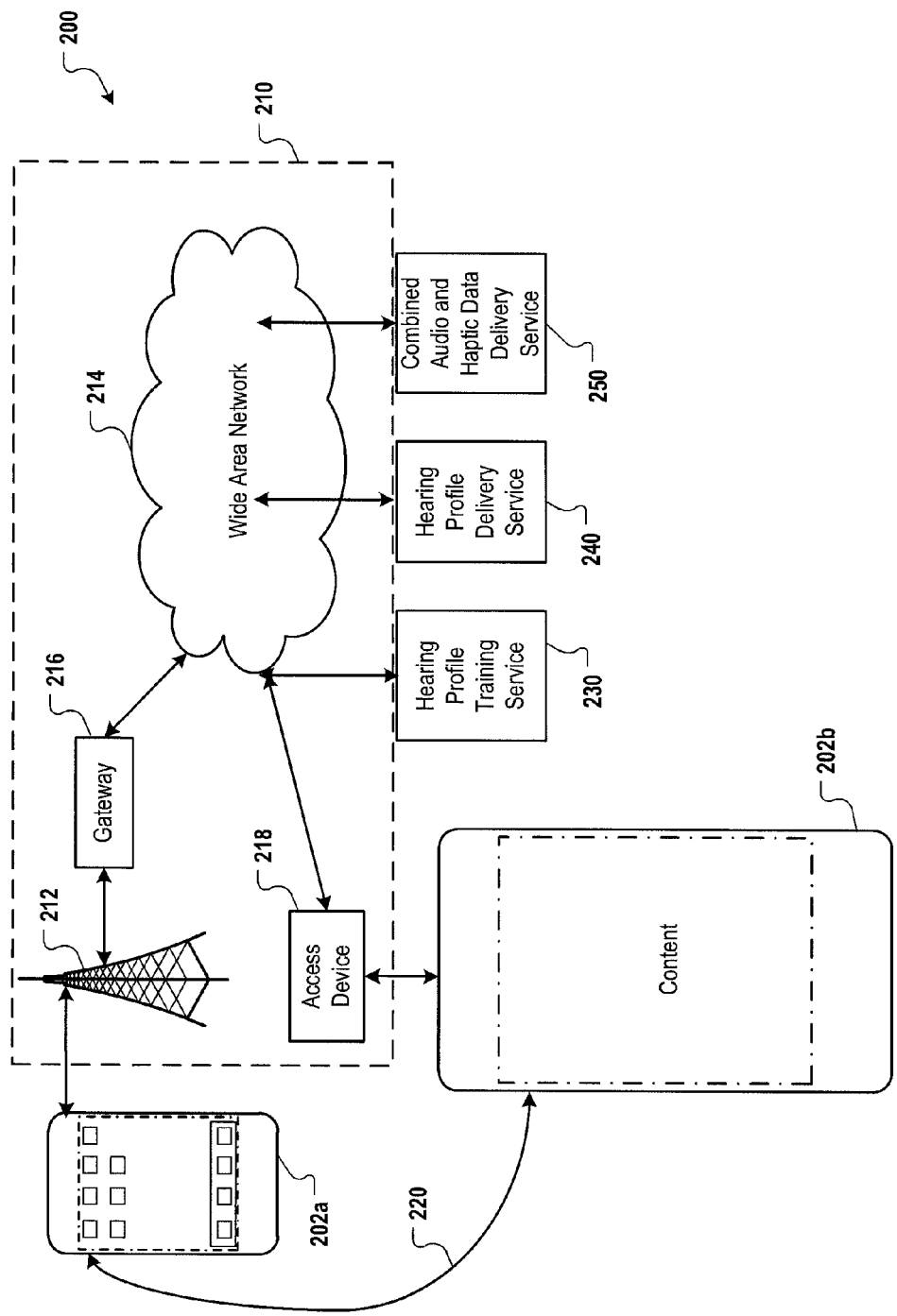
FIG. 2 is a block diagram of an exemplary network operating environment for mobile devices.

FIG. 2 is a block diagram of exemplary network operating environment 200 for the mobile devices configured to perform motion-based operations. Mobile devices 202*a* and 202*b* can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214.

In some implementations, both voice and data communications can be established over wireless network 212 and the access device 218. For example, mobile device 202*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 212, gateway 216, and wide area network 214 (e.g., using Transmission Control Protocol/Internet Protocol (TCP/IP) or User Datagram Protocol (UDP)). Likewise, in some implementations, the mobile device 202*b* can place and receive phone calls, send and receive e-mail messages, and retrieve electronic documents over the access device 218 and the wide area network 214. In some implementations, mobile device 202*a* or 202*b* can be physically connected to the access device 218 using one or more cables and the access device 218 can be a personal computer. In this configuration, mobile device 202*a* or 202*b* can be referred to as a "tethered" device.

Mobile devices 202*a* and 202*b* can also establish communications by other means. For example, wireless mobile device 202*a* can communicate with other wireless devices, e.g., other mobile devices 202*a* or 202*b*, cell phones, etc., over the wireless network 212. Likewise, mobile devices 202*a* and 202*b* can establish peer-to-peer communications 220, e.g., a personal area network, by use of one or more communication subsystems, such as the Bluetooth™ communication devices. Other communication protocols and topologies can also be implemented.

The mobile devices 202*a* or 202*b* can, for example, communicate with one or more services 230, 240, and 250 over the one or more wired and/or wireless networks. For example, one or more hearing profile training services 230 can be used to deliver one or more hearing profiles. Hearing profile delivery service 240 can provide one or more hearing profiles to mobile devices 202*a* and 202*b* for converting audio data to haptic data. Additionally, combined audio and haptic data delivery service 250 can provide one or more data files containing audio and/or haptic data for playback at mobile devices 202*a* and 202*b*.

Mobile device 202*a* or 202*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 202*a* or 202*b*. Such access can be provided by invocation of a web browsing function or application (e.g., a browser) in response to a user touching, for example, a Web object.

Figure 3:
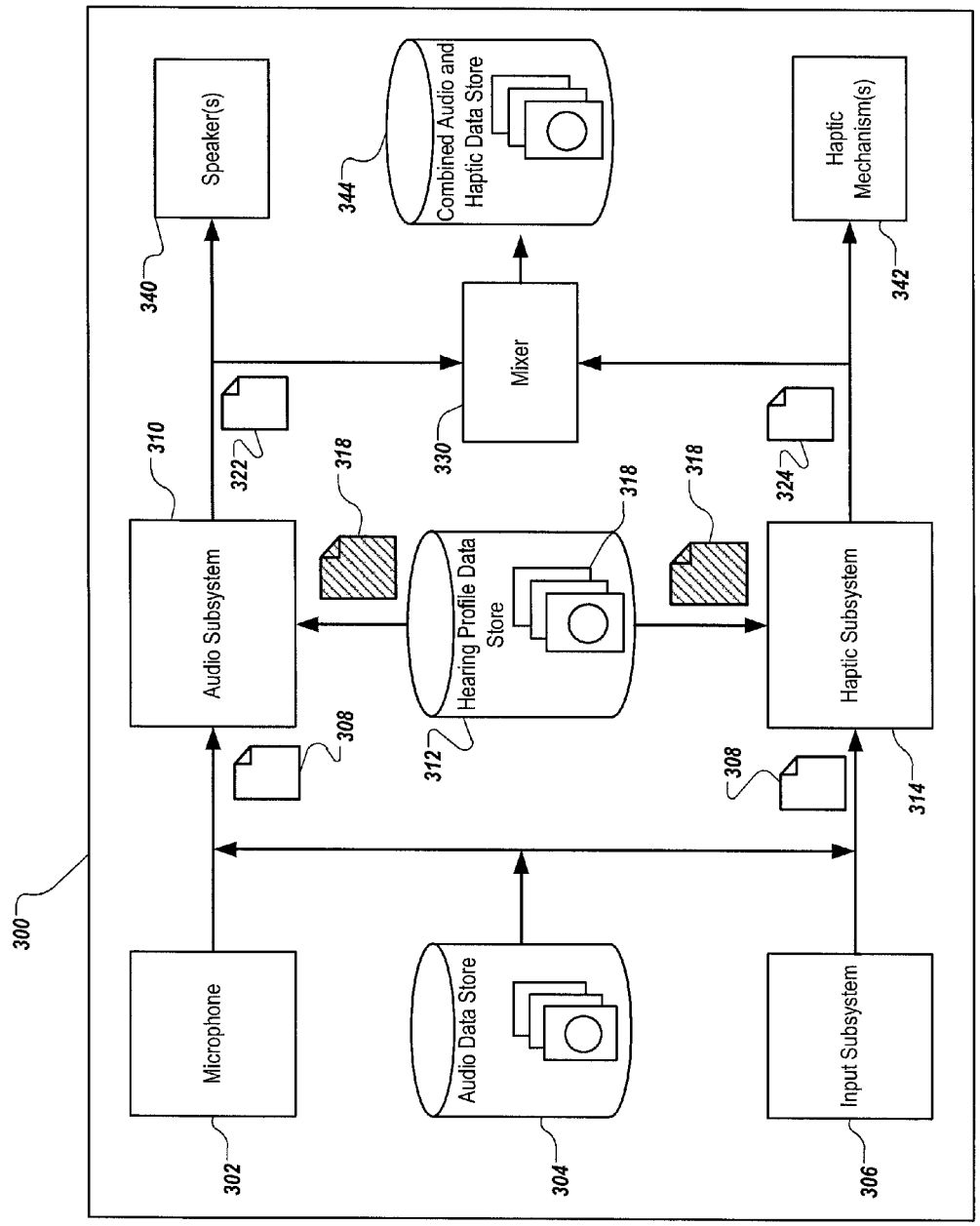
FIG. 3 is a block diagram of an exemplary mobile device configured to convert audio data to vibration patterns.

FIG. 3 is a block diagram of an exemplary mobile device 300 configured to convert audio data to vibration patterns. Mobile device 300 can include a microphone 302, an audio data store 304, and input subsystem 306. Microphone 302 can be configured to detect audible frequencies in real-time, for example, ambient noise, music, talking, or any other audibly detectable frequencies. Audio data store 304 can include a storage device that stores one or more audio data files. Input subsystem 306 can include line-in functionality to receive audio data from another device, for example another mobile device without the audio conversion to vibration functionality described in this disclosure.

Mobile device 300 can include audio subsystem 310 and haptic subsystem 314. Audio subsystem 310 can be configured to receive and processes audio data 308 received from any one of microphone 302, audio data store 304, and input subsystem 306. Audio subsystem 310 can process audio data 308 in accordance with a hearing profile 318 received from hearing profile data store 312. For example, based on hearing profile 318, audio subsystem 310 can shift a certain range of audible frequencies in audio data 308 into a different range of audible frequencies. In some implementations, audio profile 318 corresponds to the hearing capabilities of a user of mobile device 300 and indicates that the user is deaf to a certain range of frequencies. For example, an elderly user may have a specific hearing impairment that renders the elderly user partially or completely deaf to a range of high frequencies. In such case, it may be difficult for the elderly user to enjoy audio data, e.g., music and other audible stimulations, containing high frequencies within that range. To accommodate such users with a hearing impairment to a range of high frequencies, using corresponding hearing profile 318, audio subsystem 310 can shift a specific range of high frequencies in audio data 308 into a lower range of frequencies that, according to hearing profile 318, the user can hear. Frequency shifting can be performed by any suitable method. For example, by a linear shift of frequencies, morphing the frequencies, or applying common techniques involving Fourier Transforms to isolate a certain range of frequencies.

Haptic subsystem 314 can be configured to receive and process audio data 308 received in real-time from microphone 302, from storage in audio data store 304, or input from another source via input subsystem 306. Haptic subsystem 314 can process audio data 308 in accordance with a hearing profile 318 received from hearing profile data store 312. For example, based on audio profile 318, haptic subsystem 314 can convert a range of audible frequencies in audio data 308 into a vibration pattern 324. Returning again to the hearing profile 318 of the elderly user with a specific hearing impairment that renders the elderly user partially or completely deaf to a range of high frequencies. The hearing profile 318 may indicate that the elderly user, in addition to or in place of frequency shifting performed by audio subsystem 310, desires to have the specific range of high frequencies converted into a vibration pattern 324. Similarly, a range of lower frequencies can also be converted into a vibration pattern 324.

In other implementations, hearing profile 318 may correspond to the hearing preferences of a user of mobile device 300 and indicate that the user prefers certain frequencies in audio data 308 to be converted from audible frequencies into a vibration pattern 324. For example, regardless of whether the user of mobile device 300 has a hearing impairment, the user may desire to have a range of audible frequencies in audio data 308 converted into a vibration pattern 324. For example, the user may be watching a motion picture and desire to receive haptic feedback corresponding to sound effects in the motion picture. Although converting audio data into vibration patterns may not produce an accurate representation of the audio data, it may still provide a user with the sensation of enjoying the audio data by conveying the information associated with the audio data to the user.

Audio subsystem 310 and haptic subsystem 314 may operate in conjunction with one another to convey information associated with audio data to a user of mobile device 300. For example, a user of mobile device 300 may be watching a movie rich in high audible frequencies. In addition, the user may possess a hearing impairment that renders the user partially or completely deaf to a range of higher frequencies corresponding to talking or dialog in the movie. Utilizing audio subsystem 310 and haptic subsystem 314, although the user might have a hearing impairment relating to those higher frequencies, the user may still receive the information contained in those higher frequency ranges. For example, haptic subsystem 314 can convert the lower frequencies, e.g., sound effects and explosions, into vibration patterns and audio subsystem 310 can shift the higher frequencies that the user cannot hear into a lower range of frequencies which the user can hear.

In some implementations, sounds effects and spoken words are separated out into separate tracks for a movie. In such a case, audio subsystem 310 may be utilized to frequency shift all or a portion of the spoken words track into a different frequency range. Similarly, haptic subsystem 314 may be utilized to convert all or a portion of the sound effects track to haptic data and a corresponding vibration pattern.

Mobile device 300 can include mixer 330 and combined audio and haptic data store 344. Mixer 330 may be configured to receive audio data 322 from audio subsystem 322 and haptic data 324 from haptic subsystem 314. Mixer 330 can combine audio data 322 and haptic data 324 into a file of combined audio and haptic data. Data combined by mixer 330 can be stored in combined audio and haptic data store 344 for later playback by a mobile device.

Mobile device 300 may also include or be in communication with one or more audio reproduction devices or haptic feedback devices, for example speaker(s) 340 and haptic mechanism(s) 342. Speaker(s) 340 may, for example, be contained within mobile device 300. In some implementations, mobile device 300 may be in communication with headphones, copular implants, external hearing aids, or a Bluetooth device comprising speaker(s) 340. Haptic mechanism(s) 342 may be any suitable device for providing haptic feedback. For example, a spinning motor, servo motor, or piezoelectric motor, can be utilized to facilitate haptic feedback, such as vibration, force, and/or motions.

Figure 4:
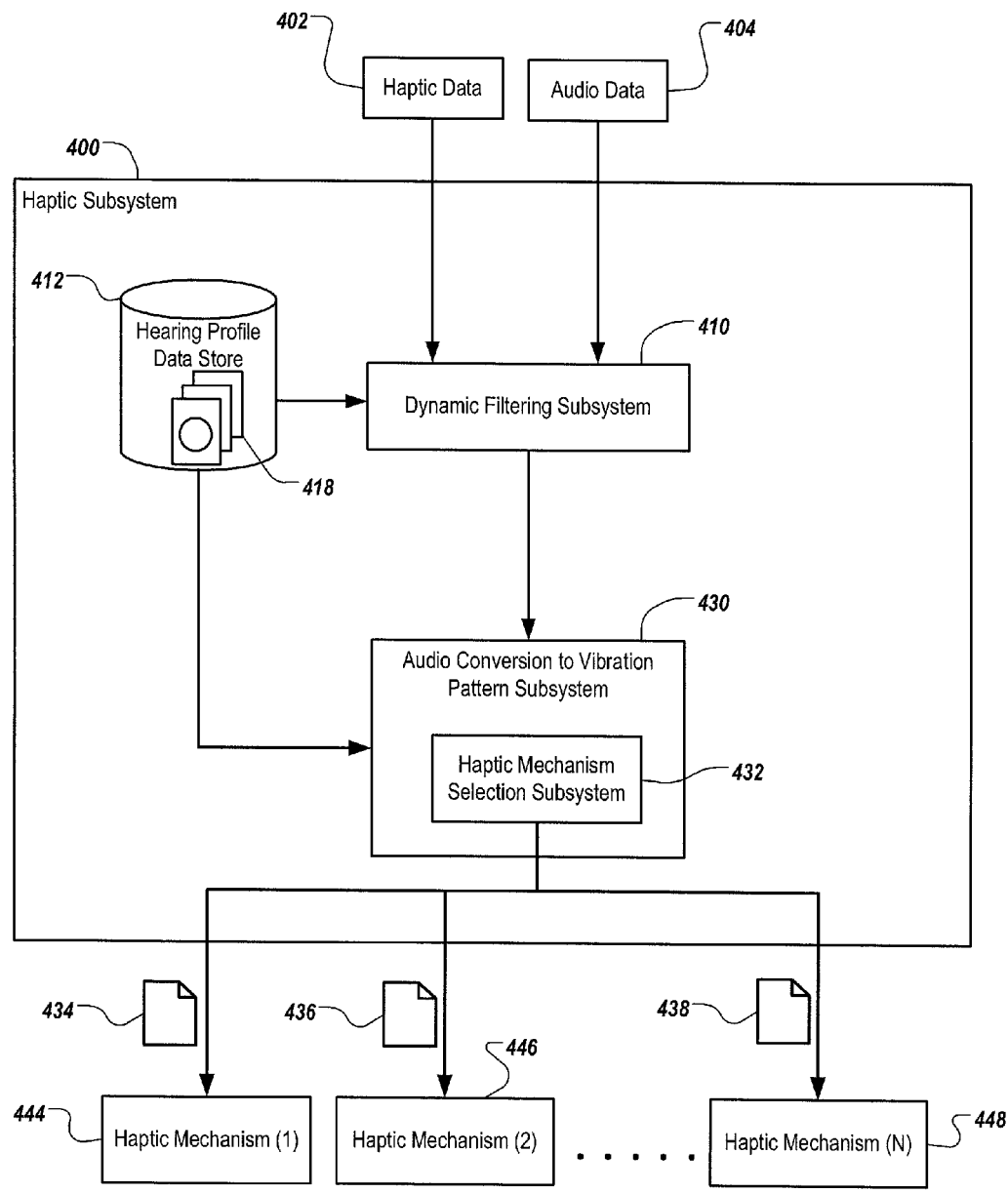
FIG. 4 is a block diagram of an exemplary haptic subsystem.

FIG. 4 is a block diagram illustrating an exemplarily haptic subsystem 400. Haptic subsystem 400 may be configured to receive both haptic data 402 and audio data 404. In some implementations, haptic data 404 may be data that has previously been processed from audio data into haptic data. For example, haptic data 324 in FIG. 3. Audio data 404 may be received from microphone 302 in real-time, from storage in audio data store 304, and/or input from another source via input subsystem 306.

Dynamic filtering subsystem 410 can perform operations on the haptic data 402 and audio data 404 in accordance with a hearing profile 418 received from hearing profile data store 412. For example, dynamic filtering subsystem can perform a low pass filter on audio data 404 to filter frequency ranges as specified in hearing profile 418. Likewise, dynamic filtering subsystem 410 can perform a band-pass or high-pass filter on audio data 404 to filter specific ranges of audio frequencies as specified in hearing profile 418. In some implementations, dynamic filtering subsystem 410 can perform a dynamic analysis of the audio data 404 to determine which frequencies should be converted into haptic data. Any suitable technique for filtering audio data may be implemented by dynamic filtering subsystem 410.

Audio conversion to vibration pattern subsystem 430 may receive filtered audio data from dynamic filtering subsystem 410 and convert a specific range or ranges into a corresponding vibration pattern. For example, if dynamic filtering subsystem 410 utilized a low-pass filter, audio conversion to vibration pattern subsystem may isolate intensities corresponding to the lower frequencies and create a suitable vibration pattern to be stored as haptic data. In some implementations, the vibration pattern can be created by taking an average of a specific range of frequencies, for example the range (20 hz-40 hz), to determine how much intensity to be included in the vibration pattern. Similarly, dynamic filtering subsystem 410 can assign a weight to the most common low frequencies and base a vibration pattern on the occurrence of the most common low frequencies.

In a mobile device with multiple haptic mechanisms 444, 446, and 448, audio conversion to vibration pattern subsystem 430 can include a haptic mechanism selection subsystem 432 to determine at which haptic mechanism a vibration pattern should be actuated. Haptic mechanisms 444, 446, and 448 may, for example, be any one of a spinning motor, servo motor, vibrator, piezoelectric device, or other suitable mechanical device for providing haptic feedback. Each haptic mechanism 444, 446, and 448, may be suitable for actuating haptic feedback corresponding to a certain audio frequency range. For example, haptic mechanism 444 may be best suited for vibration patterns 434 that correspond to audio data in the range (0 hz to 20 hz). Similarly, haptic mechanism 446 and 448 may be best suited for vibration patterns 436 and 438 corresponding to audio data in the ranges (20 hz-40 hz) and (40 hz-200 hz), respectively. In a mobile device with multiple haptic mechanisms, audio conversion to vibration pattern subsystem can create vibration patterns based on the specific capabilities of the haptic mechanisms 444-448, thus allowing for a richer variety of haptic feedback.

Figure 5:
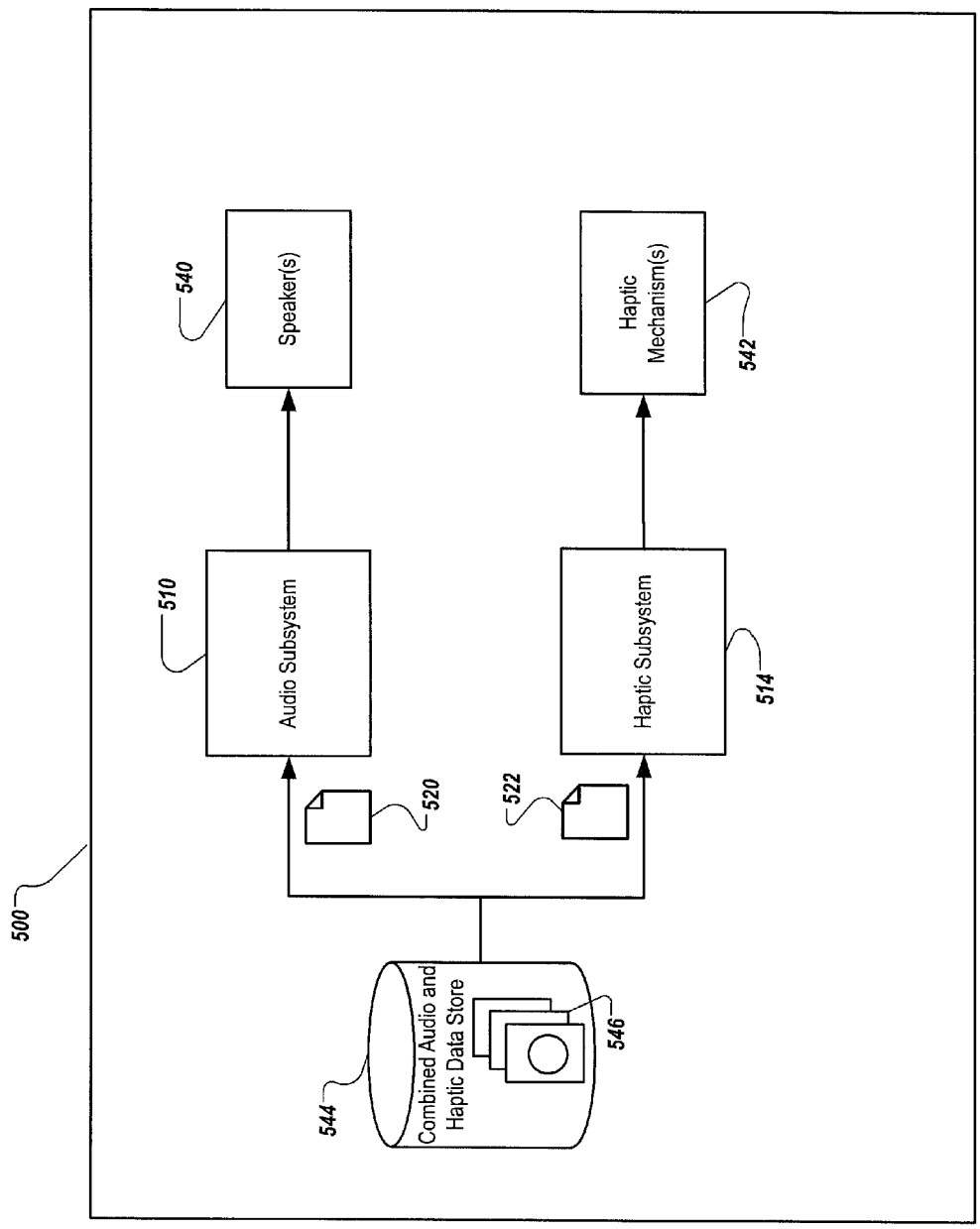
FIG. 5 is a block diagram of playback of audio and haptic data.

FIG. 5 is a block diagram illustrating playback of audio and haptic data. Mobile device 500 may contain audio and haptic data files stored in combined audio and haptic data store 544. The audio and haptic data may be part of separate files or combined into a single audio and haptic file. Audio subsystem can receive data 520, which may contain both audio and haptic data, process, and communicate the audio data 520 to speaker(s) 540 for audible playback to a user of mobile device 500. Haptic subsystem 514 can receive data 522, which may contain both audio and haptic data, process, and communicate the haptic data to haptic mechanism (s) 542 for actuating haptic feedback, e.g., a vibration pattern.

Figure 6:
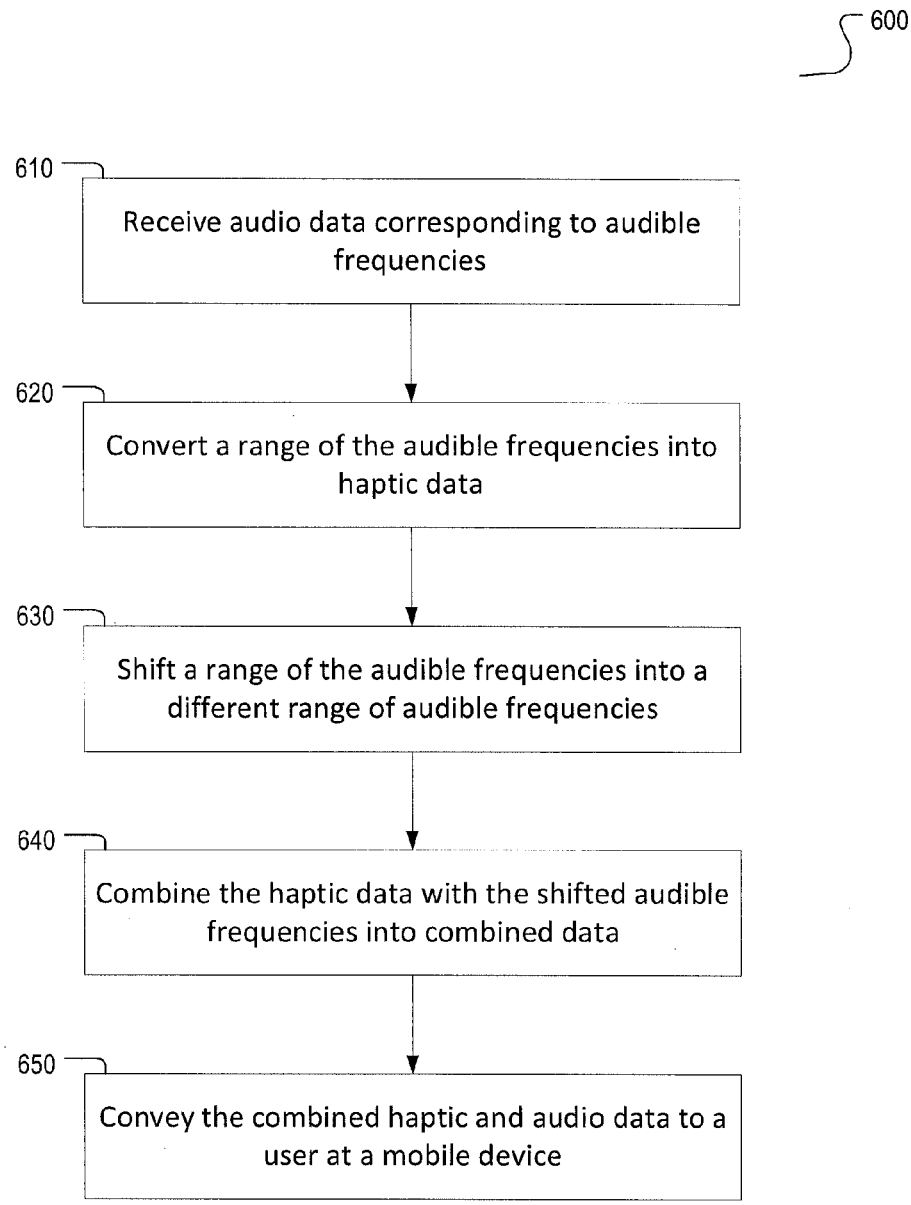
FIG. 6 is a flowchart of an exemplary method for converting audio data to haptic data.

FIG. 6 is a flowchart illustrating an exemplary method 600 for converting audio data to haptic data. In step 610, a device may receive audio data corresponding to audible frequencies. For example, ambient audio data received from a microphone in real-time, music audio data from data storage, or audio data input from another device. In step 620, a range of frequencies within the audio data may be converted into haptic data. In step 630, a range of frequencies within the audio data may be shifted into a different range of audible frequencies. In step 640, the haptic and shifted audio data can be combined into a single data file. In step 650, the combined haptic and audio data can be conveyed to a mobile device for audible and haptic feedback at the mobile device.

Figure 7:
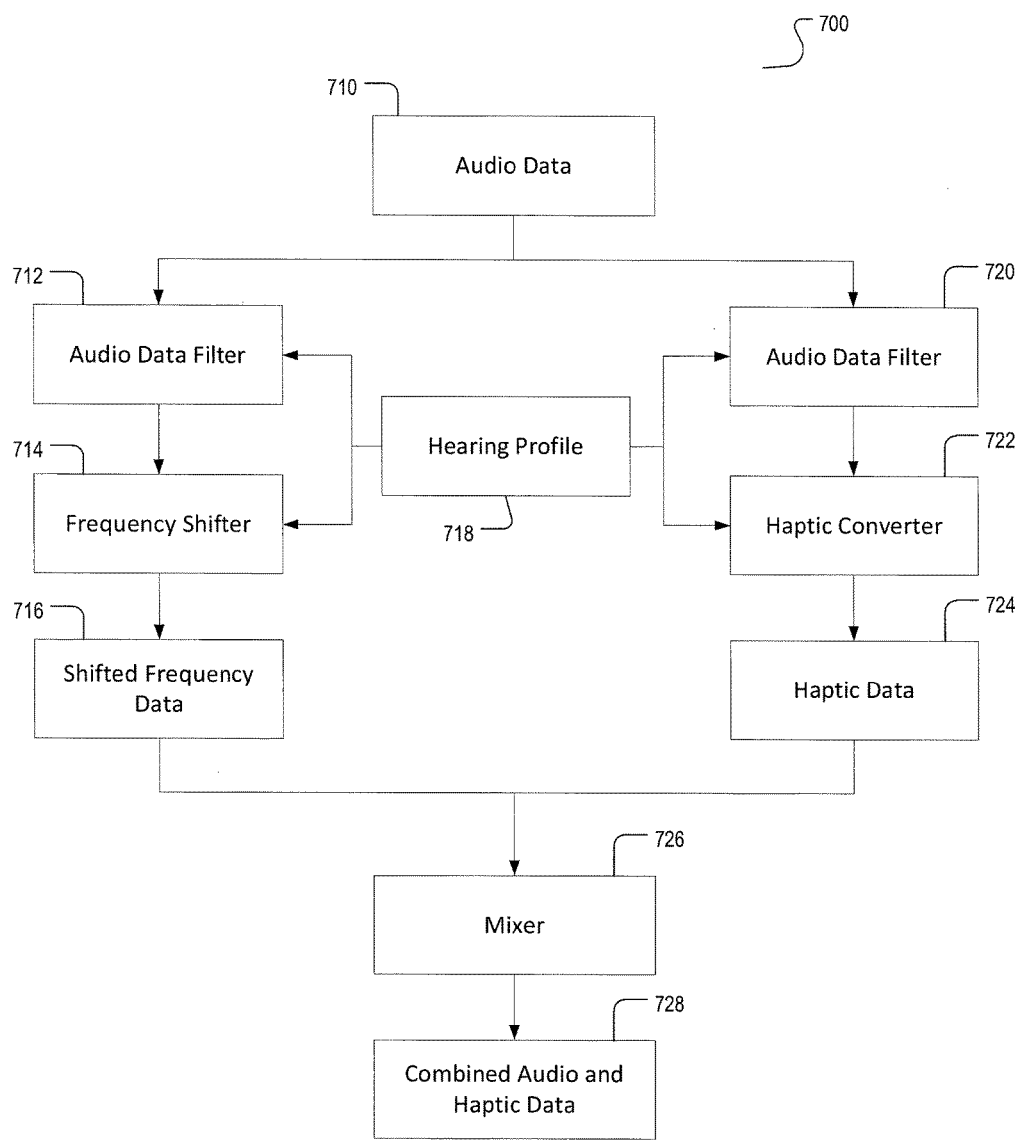
FIG. 7 is a flowchart of an exemplary method for converting audio data to haptic data.

FIG. 7 is a flowchart illustrating an exemplary method 700 for converting audio data to haptic data. Method 700 can begin with audio data 710. Audio data 710 may be filtered by audio data filter 712 in accordance with hearing profile 718 to isolate a particular range of audible frequencies for frequency shifting. Frequency shifter 714 can shift the filtered audio data received from audio data filter 712 into a different frequency range as specified by hearing profile 718. Likewise, audio filter 720 can filter audio data 710 in accordance with hearing profile 718 to isolate a particular range of audible frequencies for conversion into haptic data. Haptic converter 722 can convert the filtered audio data received from audio data filter 720 into a haptic data corresponding to a vibration pattern as specified by hearing profile 718. Mixer 726 can receive shifted frequency data 716 and haptic data 724 and combine the data into combined audio and haptic data 728.

Figure 8:
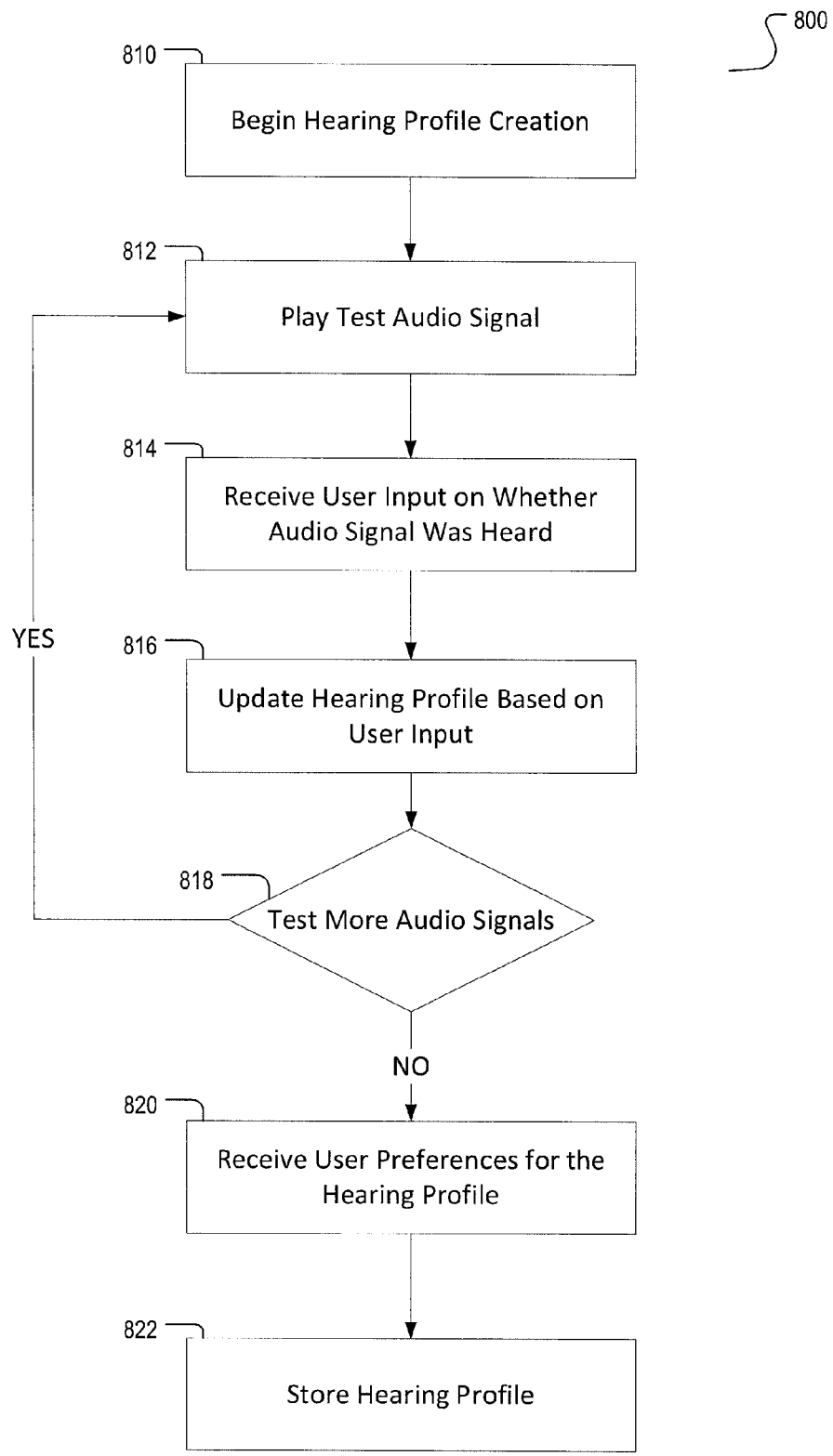
FIG. 8 is a flowchart of an exemplary method for creating a hearing profile.

Users of a mobile device may possess a wide variety of hearing impairments. Therefore, it may be beneficial to provide a user of a mobile device with the ability to create a hearing profile specifically tailored to the user. FIG. 8 is a flowchart illustrating an exemplary method 800 for creating a hearing profile. In step 810, a user selects to begin creation of a hearing profile. In step 812, a test audio signal may be communicated to the user. In step 814, the mobile device can receive input from the user that specifies whether or not the user was able to hear the audio signal. In step 816, the hearing profile is updated to reflect whether or not the user was able to hear the audible signal in step 812. For example, the audible signal played in step 812 may have been a frequency beyond the hearing capabilities of the user, in which case the hearing profile would be updated to reflect that the user cannot hear that frequency. In step 818, either from user input or based on a predetermined number of test audio signals, the hearing profile creation process can play another test audio signal. Otherwise, the user may specify certain preferences to be included in the custom hearing profile. For example, a user may prefer that sound effects contained in audio data be converted to haptic data and sent to a haptic mechanism and that spoken tracks be frequency shifted and sent to an audio output device. In step 820, the custom hearing profile creation process may ask a user more general questions, such as, "what type of hearing impairment do you have," "would you like to shift these frequencies down or up," or "would you like to add haptic feedback to your movie watching experience." In step 822, the hearing profile may be stored in a suitable hearing profile data storage device.

In addition to or in place of creating a hearing profile, a user may select a hearing profile from a predetermined number of predefined hearing profiles. For example, hearing profiles that have been created based on hearing impairment standards or conventions.

A number of implementations have been described. Nevertheless, it will be understood that various modifications may be made. For example, while the examples described herein discuss audio and haptic feedback, in some examples visual feedback may also be conveyed to a user of a mobile device. For example, visual feedback on a display of the mobile device, using lights on the mobile device, or any other suitable visual means. Audio data may be converted to visual data by utilizing similar techniques to those described in this disclosure for converting audio data to haptic data.

In addition, other steps may be provided, or steps may be eliminated, from the described flows, and other components may be added to, or removed from, the described systems. Accordingly, other implementations are within the scope of the following claims.

What is claimed is:

1. A method, comprising:
   at an electronic device with one or more audio output generators and one or more haptic output generators:
      detecting the occurrence of an event that corresponds to a respective audio signal;
      in response to detecting the occurrence of the event, concurrently:
         outputting, via the one or more audio output generators, a respective audio output that corresponds to a first portion of the respective audio signal; and
         outputting, via the one or more haptic output generators, a respective haptic output that is generated based on a second portion of the respective audio signal that is different from the first portion of the respective audio signal;
      wherein the respective audio signal includes a plurality of audio tracks, the method including deriving the respective haptic output from a first track of the plurality of the audio tracks of the respective audio signal, and deriving the respective audio output from a second track, different from the first track, of the respective audio signal.

2. The method of claim 1, wherein the first portion of the respective audio signal includes a first range of frequencies of the respective audio signal, and the second portion of the respective audio signal includes a second range of frequencies, lower than the first range of frequencies, of the respective audio signal.

3. The method of claim 1, wherein the first portion of the respective audio signal includes a first range of frequencies of the respective audio signal, and the second portion of the respective audio signal includes a second range of frequencies, higher than the first range of frequencies, of the respective audio signal.

4. The method of claim 1, wherein the respective haptic output is based on a sound effect in the respective audio signal.

5. The method of claim 1, wherein the respective audio signal includes a sound of an explosion, and the respective haptic output is based on the sound of the explosion in the respective audio signal.

6. The method of claim 1, wherein the respective haptic output is generated in advance of detecting the occurrence of the event.

7. The method of claim 1, wherein the respective audio signal is received in real time.

8. The method of claim 1, wherein the one or more haptic output generators comprise a plurality of haptic output generators, and outputting the respective haptic output includes using a first haptic output generator of the plurality of haptic output generators to generate a first subset of the respective haptic output and using a second haptic output generator of the plurality of haptic output generators to generate a second subset of the respective haptic output.

9. The method of claim 8, wherein the first subset of the respective haptic output is in a third range of frequencies and the second subset of the respective haptic output is in a fourth range of frequencies different from the third range of frequencies.

10. The method of claim 8, wherein the first haptic output generator and second haptic output generator have different capabilities.

11. An electronic device comprising:
one or more audio output generators;
one or more haptic output generators that are distinct from the one or more audio output generators;
one or more input devices; and
a processor configured to execute instructions, stored in a non-transitory machine-readable medium, to cause the electronic device to perform operations comprising:
detecting the occurrence of an event that corresponds to a respective audio signal;
in response to detecting the occurrence of the event, concurrently:
outputting, via the one or more audio output generators, a respective audio output that corresponds to a first portion of the respective audio signal; and
outputting, via the one or more haptic output generators, a respective haptic output that is generated based on a second portion of the respective audio signal that is different from the first portion of the respective audio signal;
wherein the respective audio signal includes a plurality of audio tracks, and the processor is configured to execute instructions to cause the electronic device to perform operations further including deriving the respective haptic output from a first track of the plurality of the audio tracks of the respective audio signal, and deriving the respective audio output from a second track, different from the first track, of the respective audio signal.

12. The electronic device of claim 11, wherein the first portion of the respective audio signal includes a first range of frequencies of the respective audio signal, and the second portion of the respective audio signal includes a second range of frequencies, lower than the first range of frequencies, of the respective audio signal.

13. The electronic device of claim 11, wherein the first portion of the respective audio signal includes a first range of frequencies of the respective audio signal, and the second portion of the respective audio signal includes a second range of frequencies, higher than the first range of frequencies, of the respective audio signal.

14. The electronic device of claim 11, wherein the respective haptic output is based on a sound effect in the respective audio signal.

15. A non-transitory computer readable storage medium storing one or more programs, wherein execution of the one or more programs by an electronic device having one or more audio output generators, one or more haptic output generators that are distinct from the one or more audio output generators, and one or more input devices, causes the electronic device to perform operations comprising:
detecting the occurrence of an event that corresponds to a respective audio signal;
in response to detecting the occurrence of the event, concurrently:
outputting, via the one or more audio output generators, a respective audio output that corresponds to a first portion of the respective audio signal; and
outputting, via the one or more haptic output generators, a respective haptic output that is generated based on a second portion of the respective audio signal that is different from the first portion of the respective audio signal;
wherein the respective audio signal includes a plurality of audio tracks, and execution of the one or more programs by the electronic device causes the electronic device to perform operations further including deriving the respective haptic output from a first track of the plurality of the audio tracks of the respective audio signal, and deriving the respective audio output from a second track, different from the first track, of the respective audio signal.

16. The non-transitory computer readable storage medium of claim 15, wherein the first portion of the respective audio signal includes a first range of frequencies of the respective audio signal, and the second portion of the respective audio signal includes a second range of frequencies, lower than the first range of frequencies, of the respective audio signal.

17. The non-transitory computer readable storage medium of claim 15, wherein the first portion of the respective audio signal includes a first range of frequencies of the respective audio signal, and the second portion of the respective audio signal includes a second range of frequencies, higher than the first range of frequencies, of the respective audio signal.

18. The electronic device of claim 11, wherein the respective audio signal includes a sound of an explosion, and the respective haptic output is based on the sound of the explosion in the respective audio signal.

19. The electronic device of claim 11, wherein the respective haptic output is generated in advance of detecting the occurrence of the event.

20. The electronic device of claim 11, wherein the respective audio signal is received in real time.

21. The electronic device of claim 11, wherein the one or more haptic output generators comprise a plurality of haptic output generators, and outputting the respective haptic output includes using a first haptic output generator of the plurality of haptic output generators to generate a first subset of the respective haptic output and using a second haptic output generator of the plurality of haptic output generators to generate a second subset of the respective haptic output.

22. The electronic device of claim 21, wherein the first subset of the respective haptic output is in a third range of frequencies and the second subset of the respective haptic output is in a fourth range of frequencies different from the third range of frequencies.

23. The electronic device of claim 21, wherein the first haptic output generator and second haptic output generator have different capabilities.

24. The non-transitory computer readable storage medium of claim 15, wherein the respective haptic output is based on a sound effect in the respective audio signal.

25. The non-transitory computer readable storage medium of claim 15, wherein the respective audio signal includes a sound of an explosion, and the respective haptic output is based on the sound of the explosion in the respective audio signal.

26. The non-transitory computer readable storage medium of claim 15, wherein the respective haptic output is generated in advance of detecting the occurrence of the event.

27. The non-transitory computer readable storage medium of claim 15, wherein the respective audio signal is received in real time.

28. The non-transitory computer readable storage medium of claim 15, wherein the one or more haptic output generators comprise a plurality of haptic output generators, and outputting the respective haptic output includes using a first haptic output generator of the plurality of haptic output generators to generate a first subset of the respective haptic output and using a second haptic output generator of the plurality of haptic output generators to generate a second subset of the respective haptic output.

29. The non-transitory computer readable storage medium of claim 28, wherein the first subset of the respective haptic output is in a third range of frequencies and the second subset of the respective haptic output is in a fourth range of frequencies different from the third range of frequencies.

30. The non-transitory computer readable storage medium of claim 28, wherein the first haptic output generator and second haptic output generator have different capabilities.

31. A method, comprising:
at an electronic device with one or more audio output generators and a plurality of haptic output generators:
detecting the occurrence of an event that corresponds to a respective audio signal;
in response to detecting the occurrence of the event, concurrently:
outputting, via the one or more audio output generators, a respective audio output that corresponds to a first portion of the respective audio signal; and
outputting, via the plurality of haptic output generators, a respective haptic output that is generated based on a second portion of the respective audio signal that is different from the first portion of the respective audio signal, including using a first haptic output generator of the plurality of haptic output generators to generate a first subset of the respective haptic output and using a second haptic output generator of the plurality of haptic output generators to generate a second subset of the respective haptic output.

32. The method of claim 31, wherein the first portion of the respective audio signal includes a first range of frequencies of the respective audio signal, and the second portion of the respective audio signal includes a second range of frequencies, lower than the first range of frequencies, of the respective audio signal.

33. The method of claim 31, wherein the first portion of the respective audio signal includes a first range of frequencies of the respective audio signal, and the second portion of the respective audio signal includes a second range of frequencies, higher than the first range of frequencies, of the respective audio signal.

34. The method of claim 31, wherein the respective haptic output is based on a sound effect in the respective audio signal.

35. The method of claim 31, wherein the respective audio signal includes a sound of an explosion, and the respective haptic output is based on the sound of the explosion in the respective audio signal.

36. The method of claim 31, wherein the respective haptic output is generated in advance of detecting the occurrence of the event.

37. The method of claim 31, wherein the respective audio signal is received in real time.

38. The method of claim 31, wherein the first subset of the respective haptic output is in a third range of frequencies and the second subset of the respective haptic output is in a fourth range of frequencies different from the third range of frequencies.

39. The method of claim 31, wherein the first haptic output generator and second haptic output generator have different capabilities.

40. An electronic device, comprising:
one or more audio output generators;
a plurality of haptic output generators that are distinct from the one or more audio output generators;
one or more input devices; and
a processor configured to execute instructions, stored in a non-transitory machine-readable medium, to cause the electronic device to perform operations comprising:
detecting the occurrence of an event that corresponds to a respective audio signal;
in response to detecting the occurrence of the event, concurrently:
outputting, via the one or more audio output generators, a respective audio output that corresponds to a first portion of the respective audio signal; and
outputting, via the plurality of haptic output generators, a respective haptic output that is generated based on a second portion of the respective audio signal that is different from the first portion of the respective audio signal, including using a first haptic output generator of the plurality of haptic output generators to generate a first subset of the respective haptic output and using a second haptic output generator of the plurality of haptic output generators to generate a second subset of the respective haptic output.

41. The electronic device of claim 40, wherein the first portion of the respective audio signal includes a first range of frequencies of the respective audio signal, and the second portion of the respective audio signal includes a second range of frequencies, lower than the first range of frequencies, of the respective audio signal.

42. The electronic device of claim 40, wherein the first portion of the respective audio signal includes a first range of frequencies of the respective audio signal, and the second portion of the respective audio signal includes a second range of frequencies, higher than the first range of frequencies, of the respective audio signal.

43. The electronic device of claim 40, wherein the respective haptic output is based on a sound effect in the respective audio signal.

44. The electronic device of claim 40, wherein the respective audio signal includes a sound of an explosion, and the respective haptic output is based on the sound of the explosion in the respective audio signal.

45. The electronic device of claim 40, wherein the respective haptic output is generated in advance of detecting the occurrence of the event.

46. The electronic device of claim 40, wherein the respective audio signal is received in real time.

47. The electronic device of claim 40, wherein the first subset of the respective haptic output is in a third range of frequencies and the second subset of the respective haptic output is in a fourth range of frequencies different from the third range of frequencies.

48. The electronic device of claim 40, wherein the first haptic output generator and second haptic output generator have different capabilities.

49. A non-transitory computer readable storage medium storing one or more programs, wherein execution of the one or more programs by an electronic device having one or more audio output generators, a plurality of haptic output generators that are distinct from the one or more audio output generators, and one or more input devices, causes the electronic device to perform operations comprising:
  detecting the occurrence of an event that corresponds to a respective audio signal;
  in response to detecting the occurrence of the event, concurrently:
    outputting, via the one or more audio output generators, a respective audio output that corresponds to a first portion of the respective audio signal; and
    outputting, via the plurality of haptic output generators, a respective haptic output that is generated based on a second portion of the respective audio signal that is different from the first portion of the respective audio signal, including using a first haptic output generator of the plurality of haptic output generators to generate a first subset of the respective haptic output and using a second haptic output generator of the plurality of haptic output generators to generate a second subset of the respective haptic output.

50. The non-transitory computer readable storage medium of claim 49, wherein the first portion of the respective audio signal includes a first range of frequencies of the respective audio signal, and the second portion of the respective audio signal includes a second range of frequencies, lower than the first range of frequencies, of the respective audio signal.

51. The non-transitory computer readable storage medium of claim 49, wherein the first portion of the respective audio signal includes a first range of frequencies of the respective audio signal, and the second portion of the respective audio signal includes a second range of frequencies, higher than the first range of frequencies, of the respective audio signal.

52. The non-transitory computer readable storage medium of claim 49, wherein the respective haptic output is based on a sound effect in the respective audio signal.

53. The non-transitory computer readable storage medium of claim 49, wherein the respective audio signal includes a sound of an explosion, and the respective haptic output is based on the sound of the explosion in the respective audio signal.

54. The non-transitory computer readable storage medium of claim 49, wherein the respective haptic output is generated in advance of detecting the occurrence of the event.

55. The non-transitory computer readable storage medium of claim 49, wherein the respective audio signal is received in real time.

56. The non-transitory computer readable storage medium of claim 49, wherein the first subset of the respective haptic output is in a third range of frequencies and the second subset of the respective haptic output is in a fourth range of frequencies different from the third range of frequencies.

57. The non-transitory computer readable storage medium of claim 49, wherein the first haptic output generator and second haptic output generator have different capabilities.

* * * * *